US009352740B2

(12) United States Patent
Matsunaga

(10) Patent No.: US 9,352,740 B2
(45) Date of Patent: May 31, 2016

(54) VEHICLE ENERGY-MANAGEMENT DEVICE FOR CONTROLLING ENERGY CONSUMPTION ALONG A TRAVEL ROUTE

(71) Applicant: Mitsubishi Electric Corporation, Tokyo (JP)

(72) Inventor: Takanori Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/625,879

(22) Filed: Feb. 19, 2015

(65) Prior Publication Data

US 2015/0258979 A1    Sep. 17, 2015

(30) Foreign Application Priority Data

Mar. 11, 2014  (JP) ................................. 2014-047102

(51) Int. Cl.
*B60L 9/00* (2006.01)
*B60W 10/08* (2006.01)
*B60W 10/06* (2006.01)
*B60W 50/00* (2006.01)

(52) U.S. Cl.
CPC ............... *B60W 10/08* (2013.01); *B60W 10/06* (2013.01); *B60W 20/12* (2016.01); *B60W 50/0097* (2013.01); *B60W 2550/402* (2013.01); *Y02T 10/6286* (2013.01); *Y02T 10/7077* (2013.01); *Y02T 90/161* (2013.01)

(58) Field of Classification Search
None
See application file for complete search history.

(56) References Cited

U.S. PATENT DOCUMENTS

| 6,687,581 | B2 | 2/2004 | Deguchi et al. |
| 8,285,433 | B2 | 10/2012 | Ang |
| 8,972,161 | B1 * | 3/2015 | Koebler ............. G01C 21/3469 340/995.27 |
| 2009/0259363 | A1 * | 10/2009 | Li ......................... B60K 6/445 701/36 |
| 2009/0326750 | A1 | 12/2009 | Ang |

(Continued)

FOREIGN PATENT DOCUMENTS

| JP | 2001-298805 A | 10/2001 |
| JP | 2002036903 A | 2/2002 |

(Continued)

OTHER PUBLICATIONS

Communication dated May 12, 2015, issued by the Japan Patent Office in corresponding Japanese Application No. 2014-047102.

*Primary Examiner* — Adam Alharbi
(74) *Attorney, Agent, or Firm* — Sughrue Mion, PLLC; Richard C. Turner

(57) ABSTRACT

A vehicle energy-management device is used for a vehicle that is equipped with a plurality of vehicle apparatuses driven by different energy sources. The vehicle energy-management device includes a travel route calculator that calculates a travel route of the vehicle, a travel route divider that divides the travel route into a plurality of sections, a control plan preparing unit that prepares, for each of the plurality of sections, a control plan for the plurality of vehicle apparatuses, and a vehicle apparatus controller that controls the plurality of vehicle apparatuses according to the control plan. The travel route divider determines a length of each of the sections such that a resolution is higher for a section closer to the vehicle and divides the travel route.

7 Claims, 6 Drawing Sheets

(56) References Cited

U.S. PATENT DOCUMENTS

| | | | |
|---|---|---|---|
| 2010/0010732 A1* | 1/2010 | Hartman | G01C 21/3484 701/532 |
| 2011/0313647 A1* | 12/2011 | Koebler | B60L 15/2045 701/123 |
| 2012/0010767 A1* | 1/2012 | Phillips | G01C 21/3469 701/22 |
| 2012/0010768 A1* | 1/2012 | Phillips | B60L 11/123 701/22 |
| 2013/0060416 A1 | 3/2013 | Suzuki et al. | |
| 2015/0066271 A1 | 3/2015 | Ogawa | |

FOREIGN PATENT DOCUMENTS

| | | |
|---|---|---|
| JP | 2003009310 A | 1/2003 |
| JP | 2004166392 A | 6/2004 |
| WO | 2008038466 A1 | 4/2008 |
| WO | 2011086686 A1 | 7/2011 |
| WO | 2013132640 A1 | 9/2013 |

* cited by examiner

F I G. 4

|  | SECTION RESOLUTION (Rs) | SECTION LENGTH (Ls) |
|---|---|---|
| SECTION [0] | 1 | $T_0$ |
| SECTION [1] | 3 | $3T_0$ |
| SECTION [2] | 5 | $5T_0$ |
| SECTION [3] | 7 | $7T_0$ |
| ⋮ | ⋮ | ⋮ |

VEHICLE ENERGY-MANAGEMENT DEVICE FOR CONTROLLING ENERGY CONSUMPTION ALONG A TRAVEL ROUTE

BACKGROUND OF THE INVENTION

1. Field of the Invention

The present invention relates to a vehicle energy-management device that controls energy consumption of a vehicle including a plurality of different energy sources and, in particular, to a method for dividing a route to plan control on an engine and a motor.

2. Description of the Background Art

The so-called hybrid vehicles, which are powered by a plurality of different energy sources such as fuel energy and electric energy, have various operation modes to suppress the amount of energy consumption. The operation modes of the hybrid vehicle are, for example, the traveling mode in which the vehicle is only powered by the engine, the traveling mode in which the vehicle is only powered by the motor, the traveling mode in which the vehicle is powered by the combination of the engine and the motor, and the mode in which the engine generates electric power and the generated electric power is accumulated and used to drive the motor.

For example, Japanese Patent Application Laid-Open No. 2001-298805 discloses the technique for controlling the engine and the motor of the hybrid vehicle such that the residual quantity of battery is adjusted to the target value while the amount of fuel consumption is minimized. In this technique, the travel route to the destination is divided into a plurality of sections and the state of charge (SOC) of the battery is predicted for each section.

Even if a travel route to the destination is divided into a plurality of sections and a control plan for the hybrid vehicle is prepared based on the predicted value of the amount of energy consumption in each section, changes in the actual traveling conditions cause an error between the predicted value and the actually measured value of the amount of energy consumption. The original control plan becomes inappropriate due to the accumulation of errors during traveling, whereby the control plan needs to be revised (replanned). However, frequent replanning increases the computation loads applied to the controlling device of the hybrid vehicle. In particular, the number of sections increases with increasing distance or travel time to the destination, whereby massive amounts of calculation are required to create the control plan, taking more time to create and replan the control plan.

SUMMARY OF THE INVENTION

The present invention has an object to provide a vehicle energy-management device capable of creating a vehicle control plan that allows for high energy efficiency while suppressing computation loads.

A vehicle energy-management device according to the present invention is used for a vehicle that is equipped with a plurality of vehicle apparatuses driven by different energy sources. The vehicle energy-management device includes a travel route calculator that calculates a travel route of the vehicle, a travel route divider that divides the travel route into a plurality of sections, a control plan preparing unit that prepares, for each of the plurality of sections, a control plan for the plurality of vehicle apparatuses, and a vehicle apparatus controller that controls the plurality of vehicle apparatuses according to the control plan. The travel route divider determines a length of each of the sections such that a resolution is higher for a section closer to the vehicle and divides the travel route.

The vehicle energy-management device according to the present invention gives more detailed analyses earlier in the travel route to plan the specifics of control over the vehicle apparatuses. Thus, the errors earlier in the travel route (initial errors) are small, so that the accumulation of errors up to the latter half of the travel route can be kept small. Consequently, replanning is performed less frequently, whereby the computation loads can be reduced. In addition, the sections in the latter half of the travel route have large lengths. This can prevent an increase in the number of divided sections, thereby suppressing the calculation amount required to create the control plan and reducing time required to create and replan the control plan.

In replanning, meanwhile, the plan is revised for the sections that are finely divided from the point of replanning, whereby the calculation can be performed more accurately than in the initial planning. This increases the accuracy of control, and thus, improves fuel consumption. Moreover, the calculation amount and the memory amount required for the calculation can be reduced, which allows for the use of low-priced microcomputers or memories, thereby reducing the cost of the controller.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a chart showing, as an example, results of calculating a section length of each section.

DESCRIPTION OF THE PREFERRED EMBODIMENT

Figure 1:
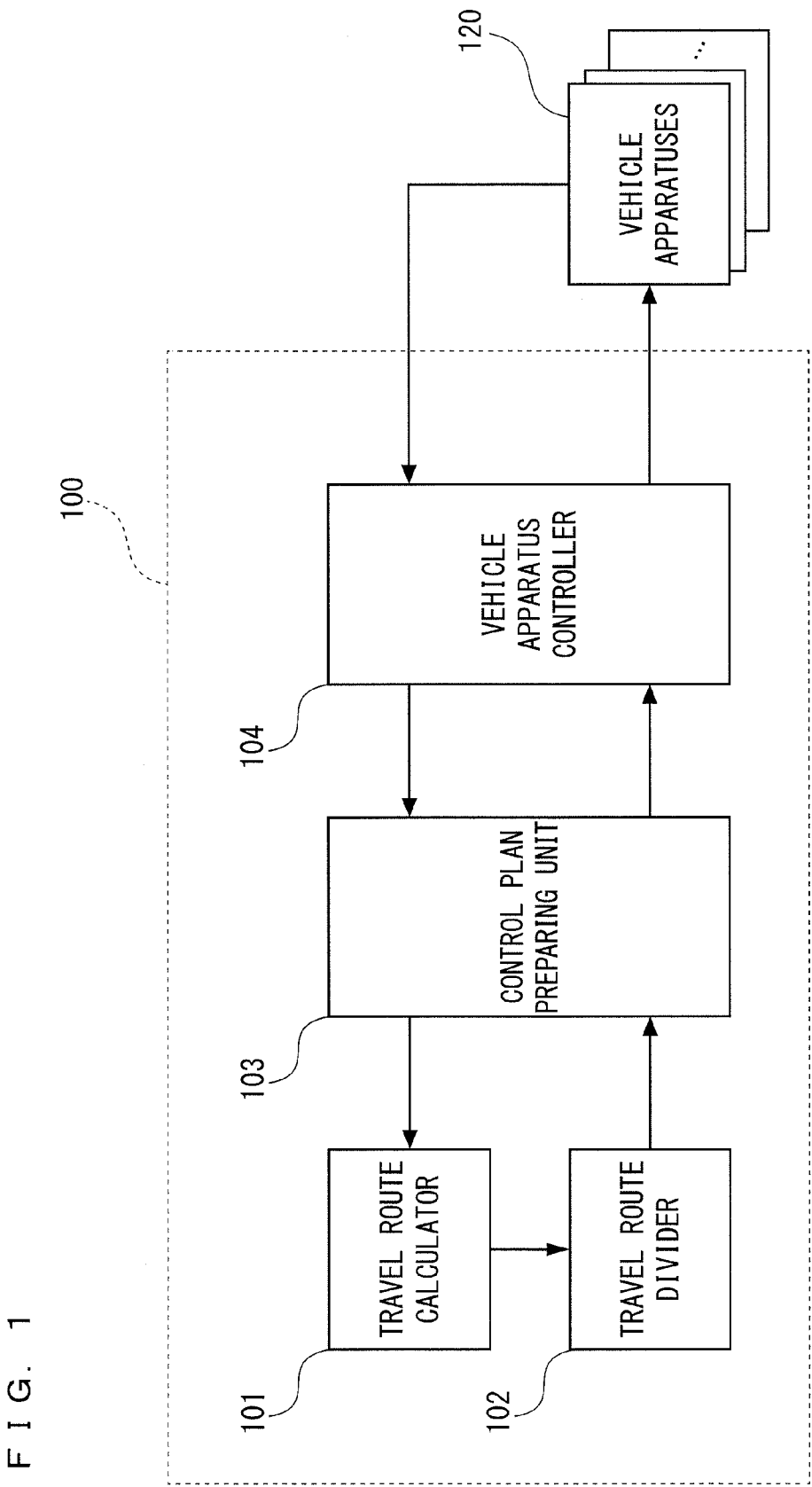
FIG. 1 is a block diagram showing a configuration of a vehicle energy-management device according to a preferred embodiment of the present invention.

FIG. 1 is a block diagram showing a configuration of a vehicle energy-management device according to a preferred embodiment of the present invention. Although the vehicle energy-management device according to the present invention is broadly applicable to the vehicles including more than one energy source, this preferred embodiment refers to the vehicle energy-management device mounted onto a vehicle that is powered by two power sources of fuel energy and electric energy.

A vehicle energy-management device 100 controls vehicle apparatuses 120 such as a motor, an engine, and a generator of a vehicle (hereinafter also referred to as "own vehicle") including the vehicle energy-management device 100 mounted thereon. The motor is capable of functioning as an electric generator (regenerative brake) that regenerates electric power during deceleration of the vehicle. The vehicle apparatuses 120 controlled by the vehicle energy-management device 100 may include apparatuses, such as an airconditioning, that are not directly related to the operation modes of the vehicle but affect the energy consumption of the vehicle.

As shown in FIG. 1, the vehicle energy-management device 100 includes a travel route calculator 101, a travel route divider 102, a control plan preparing unit 103, and a vehicle apparatus controller 104. The vehicle energy-management device 100 includes a computer and each of the above-mentioned units is implemented when the computer operates according to the program.

The travel route calculator 101 calculates a travel route from the point of departure of the own vehicle to the destination (point of arrival) using the map data. The travel route calculator 101 is capable of calculating, besides the travel route, the departure time from the point of departure and the estimated arrival time at the destination. Assume that the information, output by the travel route calculator 101, regarding the travel route of the own vehicle includes, for example, elevation information (namely, gradient information), road attributes (types such as a city road, a mountain road, and an expressway), a road width, a curve curvature and expected speed information (speed information indicating the traffic flow expected for each road at a given time) regarding each road included in the route. The travel route calculator 101 may acquire, for example, the travel route, the departure time, and the estimated arrival time of the own vehicle that are calculated by an external navigation device instead of calculating the information by itself.

The travel route divider 102 divides the travel route to the destination calculated by the travel route calculator 101 into the specific sections.

Before and while the own vehicle is on the move, the control plan preparing unit 103 prepares a control plan for controlling the vehicle apparatuses 120 including the motor, the engine, and the generator such that the amount of energy consumption (the amount of fuel consumption and the amount of electric power consumption) of the own vehicle on the whole travel route meets the predetermined conditions (for example, the condition for the closest approach to a given target value and the condition for minimizing the amount of fuel consumption).

The vehicle apparatus controller 104 controls the vehicle apparatuses 120 to switch the operation mode according to the control plan (the assignment of an operation mode to each section), output by the control plan preparing unit 103, for the vehicle apparatuses 120. Although the operation mode is generally switched when the own vehicle enters another section, in some cases, the control plan for the vehicle apparatuses 120 is changed (replanned) during the course of traveling or the operation mode according to the control plan cannot be maintained by driver's operation. In such cases, the operation mode is switched even at some midpoint of the section.

Figure 2:
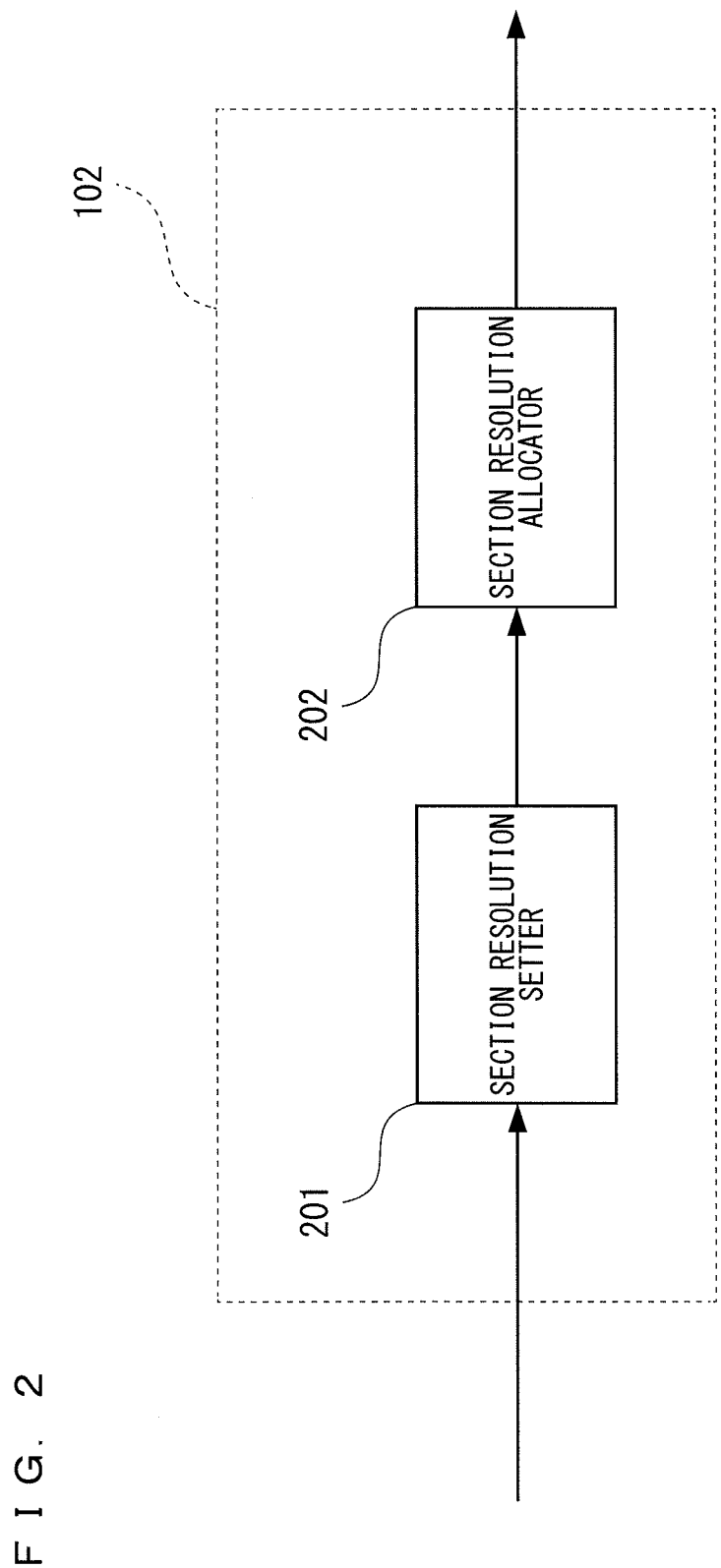
FIG. 2 is a block diagram showing a detailed configuration of a travel route divider 102.

FIG. 2 is a block diagram showing a detailed configuration of the travel route divider 102 of the vehicle energy-management device 100. The travel route divider 102 is formed of a section resolution setter 201 and a section resolution allocator 202.

The section resolution setter 201 sets a definition expression of the resolution (section resolution) of each section obtained by dividing the travel route from the current position of the own vehicle (the own-vehicle position) to the destination. The section resolution allocator 202 divides the travel route based on the definition expression of the section resolution set by the section resolution setter 201 such that the section resolution is higher for a section closer to the own vehicle (a section on the near side) and the section resolution is lower for a section farther from the own vehicle (a section closer to the destination).

The section resolution is an indicator expressing how much in detail the road characteristics and the behavior of the vehicle responsive to the road characteristics appear as the characteristics of the section. For example, the section traveled in a shorter time has a higher resolution because the characteristics of the vehicle speed change can be observed in detail using many sections. Conversely, the section traveled for a long time has a lower resolution because the vehicle speed change is repeated many times in the section and the characteristics of each speed change therefore hardly appear as the characteristics of the section.

Moreover, for example, a section including few hills has a higher resolution because the number of hills to be assessed per section is small and the characteristics of the hills are therefore likely to appear as the characteristics of the section. Conversely, a section including a number of hills has a lower resolution because the characteristics of each hill hardly appear as the characteristics of the section.

Figure 3:
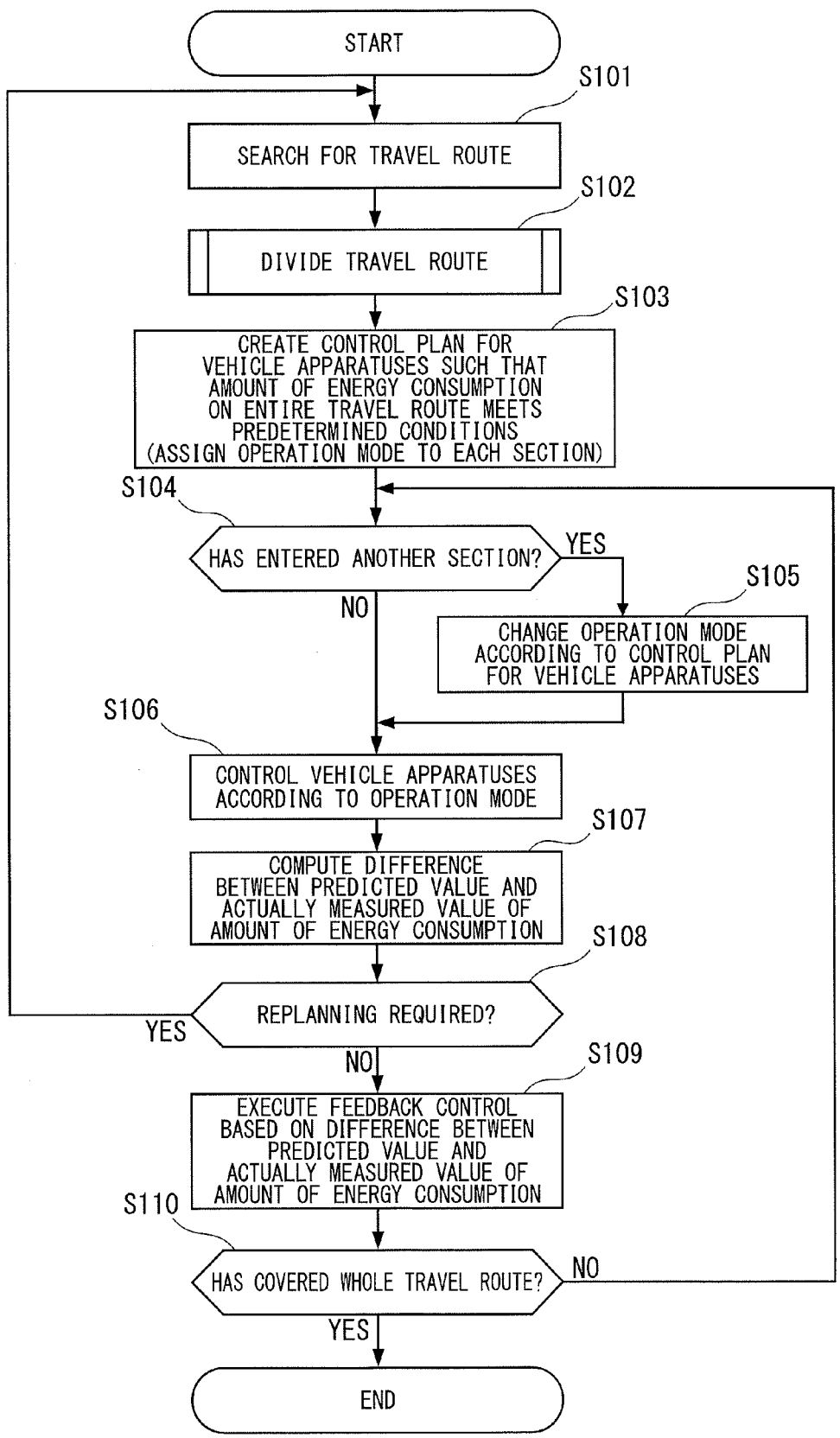
FIG. 3 is a flowchart showing an operation of the vehicle energy-management device according to the preferred embodiment of the present invention.

Next, an operation of the vehicle energy-management device 100 is described. FIG. 3 is a flowchart showing the operation of the vehicle energy-management device 100.

When the operational flow of the vehicle energy-management device 100 is started by activating the vehicle (or the vehicle-mounted system), the travel route calculator 101 firstly searches for a travel route from the own-vehicle position to the set destination (step S101). The vehicle user may set the destination with the user interface. Alternatively, the destination may be automatically set by the use of the travel route calculator 101 which estimates the destination from, for example, the past travel history.

When the search for the travel route is finished, the travel route divider 102 divides the travel route of the own vehicle into a plurality of sections (step S102). Although the present invention is characterized by the processing in which the travel route divider 102 divides the travel route into a plurality of sections, the dividing process will be described later.

After the division of travel route is completed, the control plan preparing unit 103 creates a control plan for the vehicle apparatuses 120 by assigning an operation mode to each section such that the amount of energy consumed by the own vehicle on the whole travel route meets the predetermined conditions (step S103).

When the own vehicle starts traveling, the vehicle apparatus controller 104 recognizes, based on the current position of the own vehicle, in which section on the travel route the own vehicle is and judges whether the own vehicle has entered another section (has passed the boundary of the sections) (step S104). If the own vehicle has entered another section (YES in the step S104), the operation mode of the own vehicle is switched as needed according to the control plan for the vehicle apparatuses 120 (step S105). If the own vehicle has not entered another section (NO in the step S104), the current operation mode is maintained. The vehicle apparatus controller 104 controls the vehicle apparatuses 120 according to the current operation mode (step S106).

While the own vehicle is traveling, for example, the own vehicle may be unable to travel at the planned speed due to unexpected traffic congestion or the operation mode according to the control plan may not be maintained by driver's operation. In such cases, there is a possibility that the actual amount of energy consumption (the actually measured value of the amount of energy consumption) deviates from the amount of energy consumption estimated in the previously prepared control plan for the vehicle apparatuses 120 (the predicted value of the amount of energy consumption). For example, even in the section traveled in the "coasting drive mode" or the "regenerative mode" in which the output from the engine and the motor is assumed to be zero, the driver is highly likely to control the accelerator or the brake of the own vehicle in response to the actual traffic conditions. The difference also occurs in a case where the own vehicle deviates from the planned travel route.

To recognize the deviation from the energy consumption plan, the vehicle apparatus controller 104 computes the difference between the predicted value and the actually measured value of the amount of energy consumption (step S107).

In some cases, the difference exceeds the predetermined threshold in magnitude or in variation amount, the travel route is changed due to the deviation of the own vehicle from the travel route, or the user gives the instruction to change the control plan. In such cases, the vehicle apparatus controller 104 judges that the control plan for the vehicle apparatuses 120 needs to be replanned (YES in step 108) and instructs the control plan preparing unit 103 to do the replanning, and then, this flow returns to the step S101. In other cases (NO in the step 108), the vehicle apparatus controller 104 corrects the parameters of the operation mode (such as the power ratios of engine and motor and the intensity of regeneration) such that the difference between the predicted value and the actually measured value of the amount of energy consumption obtained in the step S103 is reduced, thereby executing feedback control of the vehicle apparatuses 120 (step S109).

After that, the vehicle apparatus controller 104 checks if the own vehicle has covered the whole travel route (step S110). If the own vehicle has covered the whole travel route (YES in the step S110), this flow ends. If the own vehicle has not covered the whole travel route (NO in the step S110), this flows returns to the step S104.

The processing in which the travel route divider 102 divides the travel route in the step S102 is described. In the step S102, the section resolution setter 201 of the travel route divider 102 firstly sets the definition expression of a section resolution Rs.

The basic expression of the section resolution Rs is as follows.

$$Rs=Ls/Lo \tag{1}$$

In Expression (1), Ls represents the length of the section (section length) and Lo represents the minimum unit of section length (unit section length). The resolution of the section increases with decreasing value of the section resolution Rs, meaning that the characteristics of the route (road) in the section are assessed in more detail.

The section length Ls is defined not only as the physical length (distance) of the section but also as, for example, the predicted value of time required for the vehicle to pass through the section (hereinafter simply referred to as "travel time"), the number of branch points in the section, the number of hills in the section, and the predicted value of the number of accelerations and decelerations performed by the vehicle in the section (hereinafter simply referred to as "number of accelerations and decelerations").

The section resolution setter 201 chooses one among the following Expressions (1a) to (1e) that differ in the definition of the section length Ls from one another and sets the chosen one as the definition expression of the section resolution Rs.

In a case where the section length Ls is defined as a travel time Ts of the section, the unit section length Lo is replaced with the unit time To, so that the section resolution Rs is expressed as below.

$$Rs=Ts/To \tag{1a}$$

In this case, the resolution is higher for a section through which the vehicle passes in a shorter time. Note that the vehicle speed varies depending on the type of road (such as an expressway and an open road) and the traffic conditions (such as the presence of traffic congestion, an accident, and a construction work). Thus, the section through which the vehicle passes in a shorter time does not necessarily has the shorter distance.

In a case where the section length Ls is defined as a section distance Ds, the unit section length Lo is replaced with the unit distance Do, so that the section resolution Rs is expressed as below.

$$Rs=Ds/Do \tag{1b}$$

In this case, the resolution is higher for a section having a shorter distance.

In a case where the section length Ls is defined as the number of branch points Bs in the section, the unit section length Lo is replaced with the unit number of branch points Bo, so that the section resolution Rs is expressed as below.

$$Rs=Bs/Bo \tag{1c}$$

In this case, the resolution is higher for a section including fewer branch points. The branch points refer to branch points in a road, namely, intersections. The vehicle often accelerates and decelerates near the branch points to stop at a traffic light or to turn right or left, whereby the energy consumption of the vehicle is likely to change at the branch points. Therefore, the number of branch points serves effectively as the reference to determine the section length for assessing the amount of energy consumed by the vehicle.

In a case where the section length Ls is defined as the number of hills Hs in the section, the unit section length Lo is replaced with the unit number of hills Ho, so that the section resolution Rs is expressed as below.

$$Rs=Hs/Ho \tag{1d}$$

In this case, the resolution is higher for a section including fewer hills. As for the number of hills, a road in which the difference in elevation exceeds a given value may be counted as one upward slope or one downward slope or a road in which the distance with a series of upward slopes or downward slopes exceeds a given value may be counted as one upward slope or one downward slope. The vehicle consumes a large amount of energy in traveling on an upward slope and recovers electric energy by regeneration in traveling on a downward slope, whereby the energy consumption of the vehicle is likely to change in traveling on the hills. Therefore, the number of hills serves effectively as the reference to determine the section length for assessing the amount of energy consumed by the vehicle.

In a case where the section length Ls is defined as the number of accelerations and decelerations As of the vehicle, the unit section length Lo is replaced with the unit number of accelerations and decelerations Ao, so that the section resolution Rs is expressed as below.

$$Rs=As/Ao \tag{1e}$$

In this case, the resolution is higher for a section in which the vehicle less frequently accelerates and decelerates. An operation in which the vehicle accelerates or decelerates at a rate exceeding a given value is preferably counted as one acceleration or one deceleration. The vehicle consumes a large amount of energy in accelerating and recovers electric energy by regeneration in decelerating, whereby accelerations and decelerations are likely to change the energy consumption of the vehicle. Therefore, the number of accelerations and decelerations serves effectively as the reference to determine the section length for assessing the amount of energy consumed by the vehicle.

After the section resolution setter 201 sets the definition expression of the section resolution Rs, the section resolution allocator 202 divides the travel route into a plurality of sections while allocating the resolution of each section based on the definition expression.

The section resolution allocator 202 divides the travel route such that the section resolution is higher for a section that is closer to the own vehicle (a section on the near side) and the section resolution is lower for a section that is farther from the own vehicle (a section closer to the destination).

For example, assume that a section [0], a section [1], a section [2] . . . are in order of proximity to the own vehicle and that the section resolution allocator 202 defines the resolution of a section [i] (i=0, 1, 2, . . . ) as shown in the following expression.

$$Rs[i]=Ls[i]/Lo=2i+1 \quad (2)$$

In this case, a section length Ls [i] of the section [i] derived from Expression (1) and Expression (2) is expressed as below.

$$Ls[i]=(2i+1) \cdot Lo \quad (3)$$

For example, if the definition expression of the section resolution Rs is set to Expression (1a) in which the section length is defined as the travel time Ts of the vehicle, the section length Ls [i] of each section is expressed as below.

$$Ls[i]=(2i+1) \cdot To \quad (3a)$$

The section length of each section is derived as shown in FIG. 4.

Figure 5:
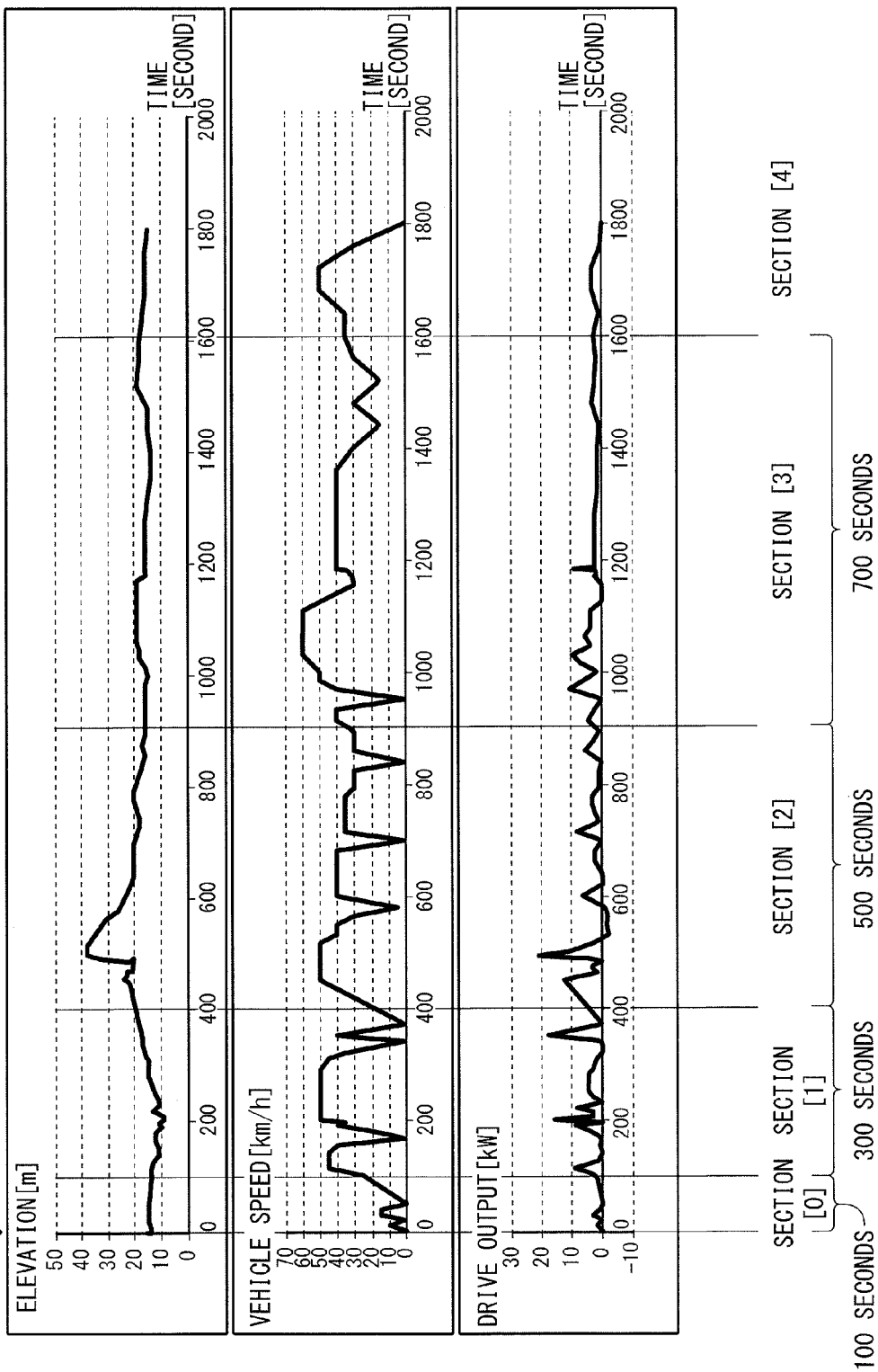
FIGS. 5 and 6 are graphs showing examples of a travel route divided by the travel route divider.

FIG. 5 is a graph showing an example of a divided travel route assuming that the section length is defined as the travel time of the vehicle. FIG. 5 shows, with time on the horizontal axis, elevation changes, vehicle speed changes (predicted values), and drive output changes (predicted values) on the travel route from the current position (point of departure) of the vehicle to the destination (point of arrival). Assuming that the unit time To corresponds to 100 seconds, a section length Ls [0] of the section [0], a section length Ls [1] of the section [1], and a section length Ls [2] of the section [2] are calculated, according to Expression (3a), at 100 seconds, 300 seconds, and 500 seconds, respectively. As shown in FIG. 5, the section resolution allocator 202 divides the travel route into the sections according to the calculation results.

For example, if the definition expression of the section resolution Rs is set to Expression (1e) in which the section length is defined as the number of accelerations and decelerations of the vehicle, the section length Ls [i] of each section is expressed as below.

$$Ls[i]=(2i+1) \cdot Ao \quad (3e)$$

Figure 6:
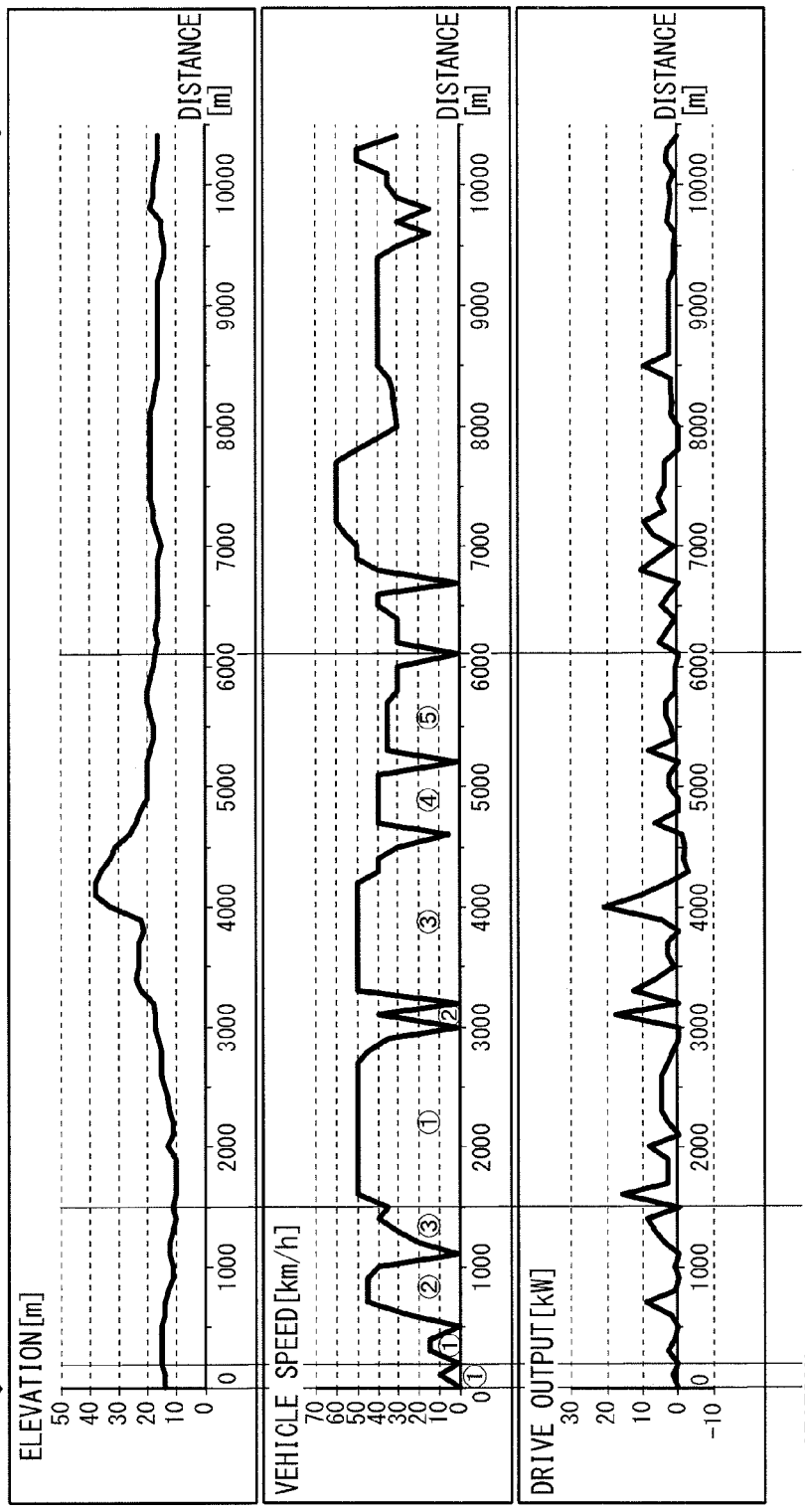

FIG. 6 is a graph showing an example of a divided travel route assuming that the section length is defined as the number of accelerations and decelerations of the vehicle. FIG. 6 shows, with distance on the horizontal axis, elevation changes, vehicle speed changes (predicted values), and drive output changes (predicted values) on the travel route from the current position (point of departure) of the vehicle to the destination (point of arrival). Assuming that the unit number of accelerations and decelerations Ao corresponds to one (in this case, a pair of acceleration and deceleration is counted as one), the section length Ls [0] of the section [0], the section length Ls [1] of the section [1], and the section length Ls [2] of the section [2] are calculated at one acceleration and deceleration, three accelerations and decelerations, and five accelerations and decelerations, respectively. As shown in FIG. 6, the section resolution allocator 202 divides the travel route into the sections according to the calculation results.

As described above, in the vehicle energy-management device 100 according to this preferred embodiment, the travel route is divided such that the section resolution is higher for a section closer to the own vehicle (a section on the near side) and the section resolution is lower for a section farther from the own vehicle (a section closer to the destination). Therefore, earlier in the travel route, the detailed characteristics of the road are likely to be reflected on the control plan for the vehicle apparatuses 120. Thus, the errors earlier in the travel route (initial errors) are reduced, so that the accumulation of errors up to the latter half of the travel route can be kept small. Consequently, the control plan for the vehicle apparatuses 120 is revised (replanned) less frequently, which can reduce the computation loads. Moreover, the sections in the latter half of the travel route have large lengths. This can prevent an increase in the number of divided sections, thereby suppressing the calculation amount required to create the control plan and reducing time required to create and replan the control plan.

In the latter half of the travel route (positions farther from the own vehicle), the travel route is divided at wide intervals. Therefore, despite an increase in distance or travel time to the destination, the number of sections can be kept small, which can also reduce the calculation amount and calculation time required to create the control plan for the vehicle apparatuses 120. The reduction in the calculation amount and the memory amount required for the calculation allows for the use of low-priced microcomputers or memories to provide the vehicle energy-management device 100, thereby contributing to cost reduction.

As described in the flow shown in FIG. 3, in a case where the control plan for the vehicle apparatuses 120 needs to be replanned (YES in the step S108), the vehicle energy-management device 100 according to the present invention divides the remaining travel route from scratch (the step S102) and creates the control plan for the vehicle apparatuses 120 (the step S103). Consequently, the control plan that is more accurate than the plan prior to the replanning is created, which is expected to improve fuel consumption of the vehicle.

In the present invention, the above preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A vehicle energy-management device for use in a vehicle that is equipped with a plurality of vehicle apparatuses driven by different energy sources, said device comprising:
   a travel route calculator that calculates a travel route of said vehicle;
   a travel route divider that divides said travel route into a plurality of sections;
   a control plan preparing unit that prepares, for each of said plurality of sections, a control plan to control energy consumption for said plurality of vehicle apparatuses; and
   a vehicle apparatus controller that controls said plurality of vehicle apparatuses according to said control plan, wherein said travel route divider determines a length of each of said sections such that a resolution is higher for a section closer along the travel route to said vehicle than other sections.

2. The vehicle energy-management device according to claim 1, wherein said travel route divider judges that a resolution is higher for a section through which said vehicle travels in a shorter time.

3. The vehicle energy-management device according to claim 1, wherein said travel route divider judges that a resolution is higher for a section having a shorter distance.

4. The vehicle energy-management device according to claim 1, wherein said travel route divider judges that a resolution is higher for a section including fewer branch points.

5. The vehicle energy-management device according to claim 1, wherein said travel route divider judges that a resolution is higher for a section including fewer hills.

6. The vehicle energy-management device according to claim 1, wherein said travel route divider judges that a resolution is higher for a section in which said vehicle less frequently accelerates and decelerates.

7. The vehicle energy-management device according to claim 1, wherein said resolution is an indicator related to how much road characteristics and behavior of the vehicle reflect characteristics of the section as a whole.

* * * * *